(12) United States Patent
Goldspink et al.

(10) Patent No.: US 8,898,309 B2
(45) Date of Patent: Nov. 25, 2014

(54) WEBSITE MONITORING AND COOKIE SETTING

(75) Inventors: Lincoln Mark Vaughan Goldspink, Southampton (GB); Malcolm John Duckett, Medstead (GB)

(73) Assignee: Speed-Trap.com Ltd., Berkshire (GB)

( * ) Notice: Subject to any disclaimer, the term of this patent is extended or adjusted under 35 U.S.C. 154(b) by 723 days.

(21) Appl. No.: 12/162,666

(22) PCT Filed: Jan. 29, 2007

(86) PCT No.: PCT/GB2007/000283
§ 371 (c)(1),
(2), (4) Date: Jul. 30, 2008

(87) PCT Pub. No.: WO2007/088331
PCT Pub. Date: Aug. 9, 2007

(65) Prior Publication Data
US 2009/0024737 A1  Jan. 22, 2009

Related U.S. Application Data

(60) Provisional application No. 60/772,409, filed on Feb. 10, 2006.

(30) Foreign Application Priority Data

Jan. 31, 2006 (GB) .................... 0601939.2

(51) Int. Cl.
*G06F 15/16* (2006.01)
*G06F 17/30* (2006.01)
*G06F 11/34* (2006.01)
*H04L 29/08* (2006.01)

(52) U.S. Cl.
CPC ........ *G06F 17/3089* (2013.01); *G06F 11/3495* (2013.01); *H04L 67/2814* (2013.01); *H04L 67/14* (2013.01); *H04L 67/02* (2013.01); *H04L 67/146* (2013.01)
USPC ............ 709/227; 709/228; 709/229; 709/223

(58) Field of Classification Search
CPC .............. G06F 17/30873; G06F 21/10; G06F 2221/2119
USPC ......................................... 709/224
See application file for complete search history.

(56) References Cited

U.S. PATENT DOCUMENTS 6,073,241 A  6/2000 Rosenberg et al.
6,098,093 A  8/2000 Bayeh et al.
(Continued)

FOREIGN PATENT DOCUMENTS

GB  2 383 505   6/2003
WO  97/26729    7/1997
(Continued)

OTHER PUBLICATIONS

International Search Report for PCT/GB2007/000283, mailed May 13, 2007.
(Continued)

*Primary Examiner* — Djenane Bayard
(74) *Attorney, Agent, or Firm* — Nixon & Vanderhye PC

(57) ABSTRACT

A method and apparatus for setting cookies on client devices 6, in particular for allowing maintenance of cross domain session continuity. A server 5 is provided for extracting a session ID from a first party cookie in the domain of the server 5 which is included in a HTTP request generated by a page 8 from a different domain active in a browser 7. Code is returned by the server 5 to that page 8 to cause it to generate a first party cookie in its domain which includes the extracted session ID.

22 Claims, 5 Drawing Sheets

(56) References Cited

U.S. PATENT DOCUMENTS

| | | | |
|---|---|---|---|
| 6,225,995 B1* | 5/2001 | Jacobs et al. | 715/738 |
| 6,510,439 B1 | 1/2003 | Rangarajan et al. | |
| 6,598,077 B2 | 7/2003 | Primak et al. | |
| 6,947,992 B1 | 9/2005 | Shachor | |
| 7,010,582 B1* | 3/2006 | Cheng et al. | 709/219 |
| 7,114,083 B2 | 9/2006 | Devine et al. | |
| 7,188,181 B1 | 3/2007 | Squier et al. | |
| 7,194,764 B2* | 3/2007 | Martherus et al. | 726/8 |
| 7,302,402 B2 | 11/2007 | Callaghan et al. | |
| 7,373,524 B2* | 5/2008 | Motsinger et al. | 713/194 |
| 7,444,666 B2* | 10/2008 | Edwards et al. | 726/1 |
| 7,730,165 B2* | 6/2010 | Shapiro | 709/220 |
| 2002/0112155 A1* | 8/2002 | Martherus et al. | 713/155 |
| 2003/0023880 A1* | 1/2003 | Edwards et al. | 713/201 |
| 2003/0187871 A1* | 10/2003 | Amano et al. | 707/102 |
| 2004/0015580 A1 | 1/2004 | Lu et al. | |
| 2004/0024881 A1* | 2/2004 | Elving et al. | 709/227 |
| 2004/0054784 A1 | 3/2004 | Busch et al. | |
| 2004/0088363 A1 | 5/2004 | Doemling et al. | |
| 2005/0198099 A1 | 9/2005 | Motsinger et al. | |
| 2006/0230265 A1* | 10/2006 | Krishna | 713/158 |
| 2006/0265495 A1 | 11/2006 | Butler et al. | |
| 2006/0277596 A1 | 12/2006 | Calvert et al. | |
| 2008/0027824 A1 | 1/2008 | Callaghan et al. | |

FOREIGN PATENT DOCUMENTS

| | | |
|---|---|---|
| WO | 00/75827 | 12/2000 |
| WO | 00/75827 A1 | 12/2000 |
| WO | 01/35259 A2 | 5/2001 |
| WO | 01/69386 | 9/2001 |
| WO | 01/89170 | 11/2001 |
| WO | 02/48899 | 6/2002 |

OTHER PUBLICATIONS

Written Opinion of the International Searching Authority for PCT/GB2007/000283, mailed May 13, 2007.

European Search Report for Great Britain Application No. 114319, dated Nov. 25, 2006.

Zumstein, P. et al., "Microsoft Internet Explorer Flaw in OBJECT Domain Security Enforcement Lets Remote Users Execute Code in Arbitrary Domains", SECURITYTRACKER.com, [Online], 3 pages, (Jul. 11, 2002).

"What are Cookies?", The U.S. Department of Energy, Computer Incident Advisory Capability, Internet Citation, [Online], pp. 1-9, (Mar. 12, 1998).

Endler, D., "The Evolution of Cross-Site Scripting Attacks", Idefense White Paper [Online], pp. 1-25, (May 20, 2002).

Zimmer, D., "Real World XSS", Net-Security Articles [Online], pp. 1-12, (Apr. 11, 2003).

Pouttu-Clarke, M. et al., "Cross Domain Cookie Provider", Internet Citation, pp. 1-5, (Jan. 19, 2005).

Cisco System Inc.: Web Step Descriptions, Cisco Customer Response Applications Developper's Guide [Online], pp. 11-1-11-12, (2001).

Yee, K P., "A Survey of Cookie Management Functionality and Usability in Web Browsers", Internet Publication, [Online], pp. 1-11, (2002).

Berry, W., "15 Seconds: Sharing Cookies Across Domains" Internet Citation, pp. 1-4, (Aug. 11, 1997).

Kings-Lynne, C., "Implementing Cross-Domain Cookies", PHP Builder Articles [Online], pp. 1-3, (Nov. 29, 2000).

Cingil I. et al., "A Broader Approach to Personalization" Communications of the Association for Computing Machinery, ACM, vol. 43, No. 8, pp. 135-141, (Aug. 2000).

Cingil, I., "Supporting Global User Profiles Through Trusted Authorities", SIGMOD Record, ACM, vol. 31, No. 1, pp. 11-17, (Mar. 2002).

International Search Report and Written Opinion re PCT/GB2007/000283 mailed May 13, 2007.

European Search Report for GB 114319 dated Nov. 25, 2006.

Doyle M., "JavaScript and Cookies," Web Development > JavaScript, Oct. 31, 2002, pp. 1-7, Retrieved from the Internet on Sep. 19, 2001 @ http://www.elated.com/articles/javascript-and-cookies.

Pouttu-Clarke M. et al., "Cross Domain Cookie Provider," Internet Citation, Jan. 19, 2005, XP002405757, Retrieved from the Internet on Nov. 6, 2006 @ http://www.theserverside.com/patterns/thread.tss?thread_id=31258.

* cited by examiner

WEBSITE MONITORING AND COOKIE SETTING

RELATED APPLICATIONS

This application is the U.S. national phase of International Application No. PCT/GB2007/000283, filed 29 Jan. 2007, which designated the U.S. and claims priority to Great Britain Application No. 0601939.2, filed 31 Jan. 2006, and claims benefit of U.S. Provisional Application No. 60/772,409, filed 10 Feb. 2006, the entire contents of each of which are hereby incorporated by reference. This application is also related to copending, commonly assigned application Ser. No. 12/162,690 which was also filed 30 Jul. 2008, naming the same cp-inventors and also entitled: WEBSITE MONITORING AND COOKIE SETTING.

BACKGROUND

1. Technical Field

This invention relates to website monitoring and the setting of cookies on client devices.

The invention as it relates to the setting of cookies on client devices is of use in website monitoring, but can also have other uses.

2. Related Art

Website monitoring or web analytics in itself is now fairly commonplace. Website monitoring/website analytics is used to monitor the performance and use of an organisation's website to help understand problems and ultimately improve the effectiveness of the site by improving "metrics" such as conversion rates and user experience, or preventing or detecting undesirable behaviour such as fraud.

What is now generally considered to be the method of choice for such monitoring is a technique which may be described as involving "client side page tagging". These techniques in themselves are well understood and one such technique has been used for some time by the Applicants. An early version of this technique is explained in detail in the Applicant's earlier applications WO01/69412 and WO01/69386. In such techniques it is now typical to put some script (for example JavaScript or Visual Basic Script) within a selection or each and every page of a website. As each page is visited this script causes there to be communication with a server responsible for the collection of events describing users' journeys/interactions with the website and managing any necessary interaction with the client.

This approach however means that scripts running in one page during a visitor's use of a monitored site will have no way of communicating with scripts running in previous or subsequent pages viewed during the visit. This necessitates a mechanism that can link the data from such a sequence of pages into one "session". The maintenance of this "session continuity" has been commonly achieved via the use of cookies, where the cookie is used to store a session ID. Cookies are only accessible within the domain in which they are set.

Here and throughout the specification, the expression "domain" is used in the sense used in relation to the Internet and "domain names". Thus a domain is defined by an Internet address xxx.com or xxx.co.uk and so on—i.e. by a top level domain name.

Cookies can be set or read by scripts running in the client browser, or by a web server communicating with the client.

Two types of cookies exist, these being first and third party cookies.

First party cookies are cookies that have been set within the domain of the page being viewed. This can be achieved by using either scripts executing within the page or by the web server(s) that are in the domain of the current page through the use of HTTP "set cookie" headers.

Third party cookies are those that are set through the use of the HTTP "set cookie" headers by web server(s) that are not in the domain of the current page (these are third party web servers).

Script executing in the current page cannot read or set third party cookies. Any web server communicating with a client will only be sent cookies currently known to the browser that are within the web server's domain. This behaviour is part of the browser security model.

Hence third or first party cookies can be used to maintain session continuity. However, only third party cookies are able to maintain session continuity between domains in a direct way. Due to security concerns, third party cookies are typically blocked by modern clients. This means that cross domain session tracking using third party cookies is ineffective.

Without third party cookies therefore, accurate cross domain session tracking has been impossible.

Whilst there are circumstances where the use of third party cookies may be illegitimate or undesirable there can be circumstances where maintaining session continuity across domains is legitimate and desirable. There are situations where this may be useful to the user and/or to an organisation which maintains websites in several different domains.

It is fairly typical for large organisations to maintain a number of websites which reside in different domains. There may, for example, be a different website for different areas of the business or a different website for each country (e.g. a .com site, a .co.uk site and so on). Thus, there may be a single enterprise with websites in different domains and the current technologies as outlined above are incapable in practical terms of allowing website monitoring across these different websites as they are visited by a user. Thus, for example, session continuity might be lost just as the user is moving to a point where he is about to make a purchase or a booking if that part of the operation is handled by a website running within a different domain.

Thus, an enterprise can be left in a situation where it has monitoring information in respect of each of its websites and could well know that many of these individual "partial sessions" in respect of the separate websites will actually relate to a single user and a single browser instance navigating across their various websites, but yet be unable to follow the whole interaction.

Brute force methods for trying to re-connect such partial sessions to give the overall picture are in reality complex, costly and unreliable. Such techniques generally only provide a best guess as to which partial sessions snap together.

Other methods exist to maintain session context across domains. Many of these are geared towards providing a single log-in across multiple domains. These typically use a series of requests and redirects to achieve the desired results. Such techniques are complex to implement and maintain.

Other possible solutions may use a customer database to maintain context. However, this approach causes problems because the customer ID will not necessarily be known at the start of a session and therefore initial phases of a visit cannot be related to later phases on other domains.

The Applicants had an objective to alleviate this problem in maintaining session context particularly in the field of website monitoring, but it is considered that the resulting techniques can have a broader application than this.

BRIEF SUMMARY

The Applicants developed an initial system for use in maintaining session context across domains (amongst other functions) using first party cookies in which use is made of the fact that when an http message is sent by a page within a browser, a header of that message can include a first party cookie in the domain of the receiver of the message even if the domain of the receiver is different than that of the page being browsed. That cookie will not be visible to the page/browser at that point because it is in the "wrong" domain, but will be visible to the receiver in the "correct" domain. Now, if that first party cookie was set while browsing a monitored page in the domain of the receiver and includes a session ID it becomes possible to get that session ID to cross into the new domain. This is achieved by the receiver of the http message sending code back to the browser to instruct it to generate a new first party cookie (in the new domain) which includes the same session ID.

This technique (which can be used for purposes other than just replicating session ID's and is subject of another patent application of the applicant's filed on the same day as this application) works well in some circumstances, but has a limitation. It is set up to work by each page, in a set of pages being monitored, being arranged to report to (send the above type of http message to) a common server in what might be called a home domain, or portal domain. This means that cross domain monitoring can only start when that home domain is visited (and can continue thereafter)—it is at that point that a first party cookie in "the domain of the receiver" will be generated.

Modifying the technique so that it can efficiently, practically, and accurately retain session context (or otherwise propagate cookies/cookie contents) across domains, regardless of the starting point or "landing page", within a predetermined set of domains, of a browsing session is not trivial. The present invention aims to allow such functionality.

According to a first aspect of the present invention there is provided a method for setting a first party cookie on a client device comprising the steps of:

receiving at a first server, an http message from an active page within a browser running on the client device, the page being in a first domain;

checking referrer information in the http message to determine if the referrer is within a domain amongst a predetermined set of domains, and if the referrer is within a domain within the predetermined set of domains, sending a redirect message to the browser instructing the browser to resend the http message to a second server, the second server being in the same domain as the referrer;

receiving at the second server, the http message from the browser and extracting data from a first party cookie, within the domain of the referrer, present in the header of the http message;

determining data which is to be included in a first party cookie, within the first domain, resident on the client device in dependence on the data extracted from the cookie, within the domain of the referrer, present in the header of the resent http message; and sending a message to the active page including an instruction to generate a first party cookie within the browser, and hence within the first domain, including the data determined in the determining step.

Typically the first server will be in the first domain.

The method may comprise the further step, before the checking referrer information step, of checking for an absence of session context between the browser and the first server.

The active page may be supplied to the client device from a page server. The first server may be separate from but in the same domain as a page server.

The cookie may be a session cookie or a permanent cookie.

The step of extracting data from the cookie present in the header of the http message may comprise the step of extracting a session ID from the cookie. The message sent to the active page may include an instruction to generate a cookie including a session ID determined in dependence on the extracted session ID. The instruction may be an instruction to generate a cookie including a session ID that is the same as the extracted session ID.

The method may comprise the further step of receiving further messages, at the first server, from the same page and/or another page within the browser that include data derived from the generated cookie. The further messages may include a session ID derived from the generated cookie. The data derived from the generated cookie may comprise the generated cookie itself.

The method may comprise the further step of the first server receiving a plurality of messages and determining whether the messages are from the same browser session in dependence on the data, derived from the cookie, present in each message.

The method may comprise the further step of the first server receiving a plurality of messages and determining whether the messages are from the same browser session in dependence on the session IDs present in each message.

There may be at least one collection server for collecting monitoring information concerning website interactions and/or performance. The method may be a website monitoring method. The method may comprise the step of receiving, from the browser running on the client device, monitoring information concerning webpage interactions and/or performance. The collection server may be separate from the first server. Preferably, the first server comprises a collection server for collecting monitoring information concerning webpage interactions and/or performance. Where the generated cookie, in the first domain, includes a session ID which is based on the data extracted from the cookie, in the domain of the referrer, present in the header of the http message, this can help to tie together monitoring information from a session where a number of different websites in different domains are visited.

There may be a set of servers comprising at least the first server and the second server. Each server in the set may be in a different domain within the predetermined set of domains. Each server in the set may be arranged to selectively carry out steps corresponding to each of the steps defined in the first aspect of the invention. This can allow a cookie to be set within the browser in each respective domain in response to a page from that domain being loaded into the browser. As the user/browser moves from domain to domain, the present technique allows the content of the cookie from the domain of the referrer to be accessed and used to set a cookie in the current domain. This means, for example, that a session ID may be propagated across domains—the present technique allows recovery of that ID from the domain of the referrer and the setting of a cookie including that session ID in the current domain.

Preferably there is a set of collection servers corresponding to the set of servers. Each of the collection servers is preferably in the same domain as a respective one of the servers. Preferably there is a set of page servers corresponding to the set of servers. Each of the page servers is preferably in the same domain as a respective one of the servers.

The method may comprise the step of each server in the set of servers, receiving an http message from a respective active page within a browser running on the client device, each respective page being in the same domain as the respective server.

The method may comprise the step of each collection server in the set of collection servers, receiving, from the browser running on the client device, monitoring information concerning webpage interactions and/or performance, in respect of web pages in the same domain as the respective collection server.

After the steps defined in the first aspect of the invention, the method may comprise the steps of:

receiving at a third server, an http message from an active page within a browser running on the client device, the page being in a third domain;

checking the referrer information in the http message and on determining that the referrer is in the first domain, sending a redirect message to the browser instructing the browser to resend the http message to the first server;

receiving at the first server, the http message from the browser and extracting data from the first party cookie, within the first domain, present in the header of the http message;

determining data which is to be included in a first party cookie, within the third domain, resident on the client device in dependence on the data extracted from the cookie, within first domain, present in the header of the resent http message; and sending a message to the active page including an instruction to generate a first party cookie within the browser, and hence within the third domain, including the data determined in the determining step.

The above is a specific example of moving on from the first domain to a third domain (i.e. not the "domain of the referrer" as mentioned in the first aspect of the invention). It will be clear that, as explained above, this process can step on again to other domains, in the predetermined set of domains and having web pages that have been appropriately set up. It will also be noted that because of the order in which the domains are mentioned in the first aspect of the invention, there is a seemingly illogical numbering if things are considered chronologically. The navigation is from the "domain of referrer" to the "first domain" to the "third domain". In the specific description further below the navigation is described in a more numerically logical way from a chronological point of view, i.e. from a first domain (A), to a second (B), to a third (C).

The message from the active page may comprise a request for a page component. The message from the active page may comprise an http request.

The message to the active page may comprise a portion of script, for example JavaScript or Visual Basic Script. The portion of script may be arranged to execute within the page to generate the cookie including the data determined in the determining step.

In general terms in this specification the client device may be any device capable of supporting a browser or other program utilising http protocols. In general terms in this specification a browser may be any module capable of allowing the browsing of pages that can generate and receive messages, in particular which can send messages including http headers. As will be clear, in one example, the client device may comprise a PC running conventional browser software such as MS Internet Explorer®, but in other examples the client device might be a mobile telephone or other such device and may include an embedded browser.

According to a second aspect of the present invention there is provided apparatus for causing setting of a first party cookie on a client device, the apparatus comprising a first sever and a second server, the first server being arranged under the control of software to:

receive an http message from an active page within a browser running on the client device, the page being in a first domain;

check referrer information in the http message to determine if the referrer is within a domain amongst a predetermined set of domains, and if the referrer is within a domain within the predetermined set of domains, send a redirect message to the browser instructing the browser to resend the http message to a second server, the second server being in the same domain as the referrer;

the second server being arranged under the control of software to:

receive the http message from the browser and extract data from a first party cookie, within the domain of the referrer, present in the header of the http message;

determine data which is to be included in a first party cookie, within the first domain, resident on the client device in dependence on the data extracted from the cookie, within the domain of the referrer, present in the header of the resent http message; and send a message to the active page including an instruction to generate a first party cookie within the browser, and hence within the first domain, including the data determined in the determining step.

According to a third aspect of the present invention there is provided apparatus for causing setting of a first party cookie on a client device, the apparatus comprising a first sever and a second server, the first server having:

a receive module for receiving an http message from an active page within a browser running on the client device, the page being in a first domain;

a check module for checking referrer information in the http message to determine if the referrer is within a domain amongst a predetermined set of domains, and if the referrer is within a domain within the predetermined set of domains causing sending of a redirect message, by a send module, to the browser instructing the browser to resend the http message to a second server, the second server being in the same domain as the referrer;

the second server having:

a receive module for receiving the http message from the browser;

an extract module for extracting data from a first party cookie, within the domain of the referrer, present in the header of the http message;

a determination module for determining data which is to be included in a first party cookie, within the first domain, resident on the client device in dependence on the data extracted from the cookie, within the domain of the referrer, present in the header of the resent http message; and a send module for sending a message to the active page including an instruction to generate a first party cookie within the browser, and hence within the first domain, including the data determined by the determination module.

According to a fourth aspect of the present invention there is provided a website monitoring method comprising the steps of:

receiving at a first server, an http message from an active page within a browser running on the client device, the page being in a first domain;

checking referrer information in the http message to determine if the referrer is within a domain amongst a predetermined set of domains, and if the referrer is within a domain within the predetermined set of domains, sending a redirect message to the browser instructing the browser to resend the http message to a second server, the second server being in the same domain as the referrer;

receiving at the second server, the http message from the browser and extracting data from a first party cookie, within the domain of the referrer, present in the header of the http message;

determining data which is to be included in a first party cookie, within the first domain, resident on the client device in dependence on the data extracted from the cookie, within the domain of the referrer, present in the header of the resent http message;

sending a message to the active page including an instruction to generate a first party cookie within the browser, and hence within the first domain, including the data determined in the determining step; and receiving at one of the first server and a separate collection server, from the browser running on the client device, messages including data derived from the generated cookie and information concerning at least one of: interactions with and performance of at least one page browsed within the browser running on the client device.

According to a fifth aspect of the present invention there is provided a website monitoring apparatus, the apparatus comprising a first sever, a second server, and a collection server,
the first server being arranged under the control of software to:
receive an http message from an active page, within a browser running on the client device, the page being in a first domain;
check referrer information in the http message to determine if the referrer is within a domain amongst a predetermined set of domains, and if the referrer is within a domain within the predetermined set of domains, send a redirect message to the browser instructing the browser to resend the http message to a second server, the second server being in the same domain as the referrer;
the second server being arranged under the control of software to:
receive the http message from the browser and extract data from a first party cookie, within the domain of the referrer, present in the header of the http message;
determine data which is to be included in a first party cookie, within the first domain, resident on the client device in dependence on the data extracted from the cookie, within the domain of the referrer, present in the header of the resent http message; and
send a message to the active page including an instruction to generate a first party cookie within the browser, and hence within the first domain, including the data determined in the determining step; and
the collection server being in the first domain and arranged under the control of software to:
receive, from the browser running on the client device, messages including data derived from the generated cookie, and information concerning at least one of: interactions with and performance of at least one page browsed within the browser running on the client device; and
determine whether received messages are from the same browser session in dependence on the data derived from the generated cookie present in each message.

According to a sixth aspect of the present invention there is provided a website monitoring apparatus, the apparatus comprising a first sever, a second server, and a collection server,
the first server having:
a receive module for receiving an http message from an active page within a browser running on the client device, the page being in a first domain;
a check module for checking the referrer information in the http message to determine if the referrer is within a domain amongst a predetermined set of domains, and if the referrer is within a domain within the predetermined set of domains causing sending of a redirect message, by a send module, to the browser instructing the browser to resend the http message to a second server, the second server being in the same domain as the referrer;
the second server having:
a receive module for receiving the http message from the browser;
an extract module for extracting data from a first party cookie, within the domain of the referrer, present in the header of the http message;
a determination module for determining data which is to be included in a first party cookie, within the first domain, resident on the client device in dependence on the data extracted from the cookie, within the domain of the referrer, present in the header of the resent http message; and
a send module for sending a message to the active page including an instruction to generate a first party cookie within the browser, and hence within the first domain, including the data determined by the determination module; and
the collection server comprising:
a receive module for receiving, from the browser running on the client device, messages including data derived from the generated cookie and information concerning at least one of: interactions with and performance of at least one page browsed within the browser running on the client device; and
a determination module for determining whether received messages are from the same browser session in dependence on the data derived from the generated cookie present in each message.

The first server may comprise the collection server.

Where website monitoring is undertaken, it will be appreciated that monitoring activity may have taken place before the steps defined in the above aspects of the invention. In particular there may have been monitoring of activity in the referrer's domain. The present techniques allow this activity to be tied to that in the "first" domain as well as that in subsequent domains (where the websites visited are appropriately set up and in the "predetermined set of domains").

According to a seventh aspect of the present invention there is provided a method for setting a first party cookie on a client device comprising the steps of:
sending from an active page, in a first domain, within a browser running on the client device, to a first server, an http message including referrer information;
receiving a redirect message in the browser, from the first server, instructing the browser to resend the http message to a second server, the second server being in the same domain as the referrer;

resending from the browser, the http message to the second server including a first party cookie, within the domain of the referrer, in the header of the http message;

receiving a message, from the second server, in the active page including an instruction to generate a first party cookie within the browser, and hence within the first domain, including the data determined in dependence on the content of the first party cookie in the domain of the referrer as received by the second server; and generating within the browser running on the client device, a first party cookie, in the first domain, in response to the received instruction.

According to an eighth aspect of the present invention there is provided a client device arranged under the control of software to:

send from an active page, in a first domain, within a browser running on the client device, to a first server, an http message including referrer information;

receive a redirect message in the browser, from the first server, instructing the browser to resend the http message to a second server, the second server being in the same domain as the referrer;

resend from the browser, the http message to the second server including a first party cookie, within the domain of the referrer, in the header of the http message;

receive a message, from the second server, in the active page including an instruction to generate a first party cookie within the browser, and hence within the first domain, including the data determined in dependence on the content of the first party cookie in the domain of the referrer as received by the second server; and generate within the browser running on the client device, a first party cookie, in the first domain, in response to the received instruction.

In general terms each of the optional features defined above in relation to the first aspect of the invention are equally applicable to the other above aspects of the invention, with the necessary changes in wording and where context allows. Thus, it will be understood that the apparatus, systems, and computers defined above may be arranged under the control of software to carry out the optional steps defined above. Similarly they may comprise modules for carrying out the appropriate actions. Moreover, where a step is carried out by the server there will often be a corresponding step carried out by the client and clearly therefore the method operated by the client can include such steps and the client can be arranged/ have modules to carry those steps out.

These optional features are not restated multiple times purely in the interests of brevity.

According to a ninth aspect of the present invention there is provided a computer program comprising code portions which when loaded and run on a computer cause the computer to carry out any one of the methods defined above.

According to a tenth aspect of the present invention there is provided a computer program comprising code portions which when loaded and run on a computer cause the computer to comprise any one of the apparatus defined above.

According to a eleventh aspect of the present invention there is provided a computer program product comprising a machine readable data carrier carrying a program according to the above aspects of the invention.

BRIEF DESCRIPTION OF THE DRAWINGS

Embodiments of the present invention will now be described by way of example only, with reference to the accompanying drawings in which.

DETAILED DESCRIPTION OF EXEMPLARY EMBODIMENTS

Figure 1:
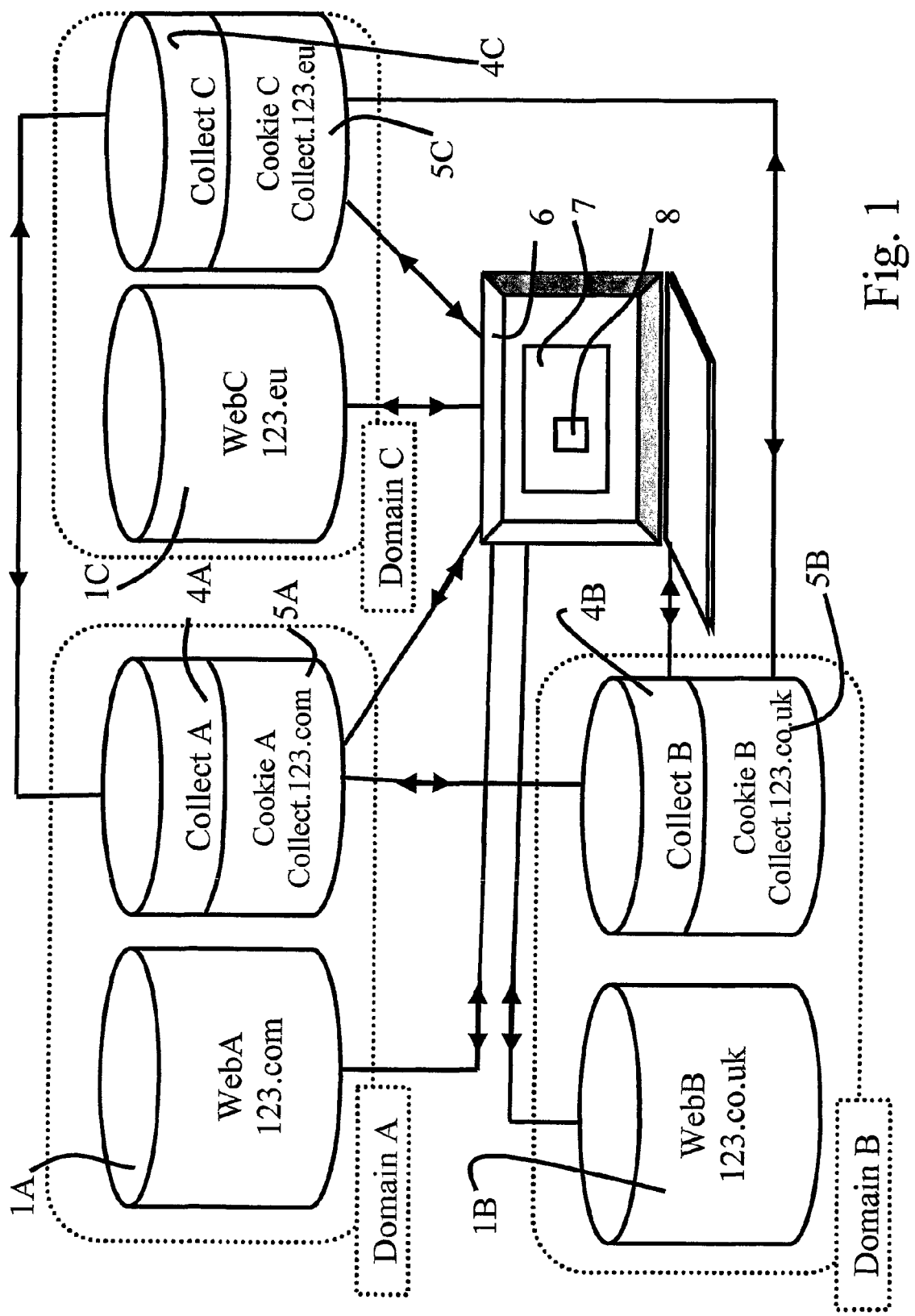
FIG. 1 schematically shows architecture that may be used in a website monitoring system.

FIG. 1 schematically shows architecture that may be used in a website monitoring system which uses client side page tagging to generate and collect a series of events describing a user's journey/interactions with a number of websites.

The architecture comprises a first web server 1A in domain A (123.com), a second web server 1B in domain B (123.co.uk) and a third web server 1C in domain C (123.eu). There is also a first collection server 4A located in the same domain as the first web server, i.e. in domain A as well as second and third collection servers 4B and 4C, each in the same domain as a respective one of the web servers, 1B, 1C. In this embodiment, each collection server 4A, 4B, 4C also comprises a respective cookie control server 5A, 5B, 5C which in other embodiments might be separate from the collection server 4A, 4B, 4C. The collection servers 4A, 4B, 4C, in particular the cookie control servers 5A, 5B, 5C are interconnected with one another.

A client device 6 running a browser 7 is connectable to each of the web servers 1A, 1B, 1C and collection servers 4A, 4B, 4C via a network for example via the Internet. In this embodiment, the client device 6 comprises a conventional PC with conventional components allowing the browser 7 to be run on the computer 6 and allowing the browser 7 to receive web pages from the web servers 1A, 1B, 1C(via the use of HTTP messages) and to send and receive http messages to and from the collection servers 4A, 4B, 4C.

A user may use the client device 6 to browse web pages supplied from the web servers 1A, 1B, 1C, but also may, of course, browse to any other web pages which he or she chooses. In the present example, the three web servers, 1A, 1B, 1C all belong to the same enterprise, but yet are in different domains. In particular the first web server 1A is in the domain A (which is 123.com) whereas the second web server 1B is in the domain B (which is 123.co.uk) and the third web server 1C is in the domain C (which is 123.eu).

In the current example we are interested in being able to monitor the web site performance of web sites hosted by each of these three servers 1A, 1B, 1C and in particular this is to be done by collecting, at the collection servers 4A, 4B, 4C information concerning the user's interactions with web sites hosted on each of the web servers 1A, 1B, 1C when using the client device 6. Moreover, the present invention is directed at allowing the user's interactions with websites from each of the web servers 1A, 1B, 1C to be associated together and treated as a single session for the purposes of analysing the monitoring information.

The actual techniques used for monitoring the user's interactions with each of the websites and collecting this information at the collection servers 4A, 4B, 4C as well as for analysing this information and so on are not of particular interest in the present specification. There are a number of conventional techniques which may be used in that part of the process.

What is of interest in the present specification, is the process used for tying together information collected by the collection servers 4A, 4B, 4C concerning the user's interactions with websites hosted on the different web servers 1A, 1B, 1C and therefore located in different domains.

Use is made of first party cookies to retain session continuity; that is to say to allow interactions with websites on each of the web servers 1A, 1B, 1C to be associated with one another.

It will be appreciated that the mention of three different web servers and three different web sites is completely arbitrary and the present technique can work with practically any number of suitably set up web sites. Similarly, of course, there may be almost any number of users interacting with the monitored sites using respective client devices 6.

When the user is browsing web sites using the client device 6, he may visit any number of web sites in any order, but we are interested in the mechanisms which can occur when a user browses one or more pages from a site which has been set up to function as part of the present technique, for example, one from one or more of the first to third web servers 1A, 1B, 1C.

If the user visits web pages which are not appropriately set up, then monitoring of interactions with those web pages will not be carried out. However, as and when the user browses to a page which is appropriately set up, and in a domain already visited, monitoring can be re-commenced and associated with the monitoring which took place earlier provided it is still within the same browser session. This limitation to the interactions only being tied up if taking place within the same browser session comes about because the present embodiment makes use of first party session cookies.

In an alternative, permanent (as opposed to session) cookies could be used. This could allow session continuity over extended periods, i.e. not limited to a single browser session, provided that the appropriate permanent cookie or cookies remain resident in a particular browser.

Figure 2:
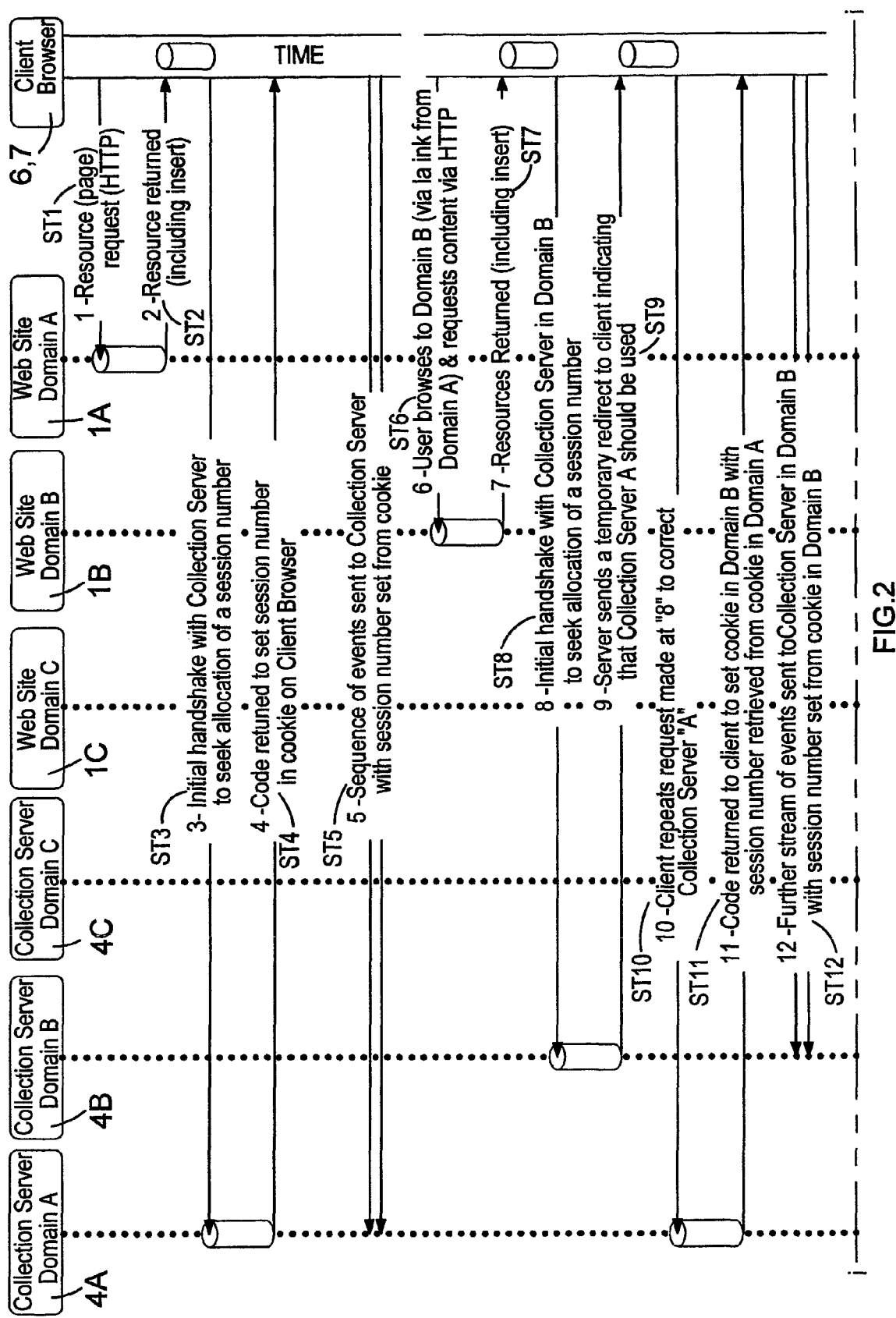
FIG. 2 schematically shows a sequence diagram of client/ server interactions in the operation of part of the website monitoring system.
Figure 2:
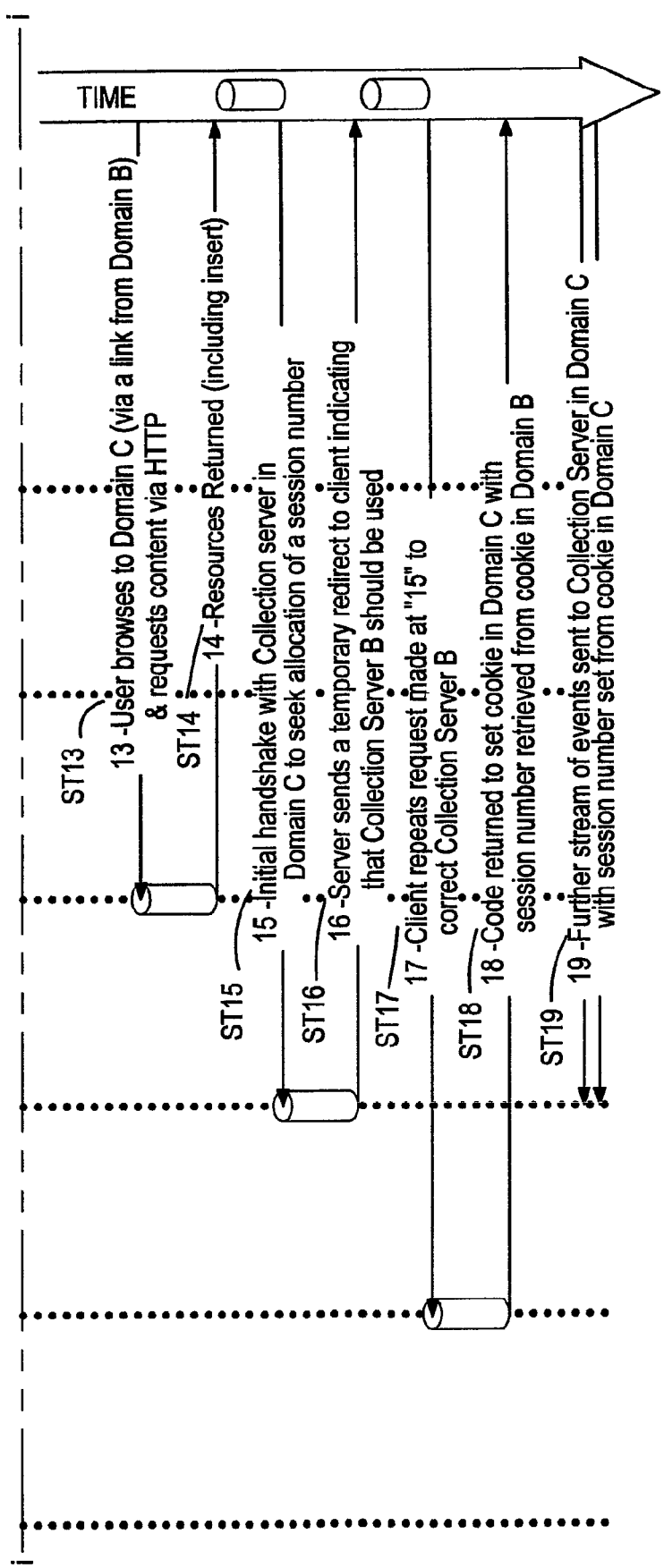

FIG. 2 is a sequence diagram showing the client/server interactions which take place as the user uses the client device 6 to first of all visit a web site provided on the first web server 1A and hence in the same domain as the first collection server 4A and then subsequently visits web sites in different domains, covered by the system, in this case those in domains B and C provided by the second and third web servers 1B and 1C and hence in the same domains as the second and third collection servers 4B, 4C.

Referring now to FIG. 2 the first stage in this process, step ST1, occurs with the client device 6 requesting a page 8 from the first web server 1A and loading it, step ST2, into its browser 7. In FIG. 2 the passage of time is shown downwards, so this initial situation is represented at the top of the drawing.

The received page 8 contains appropriate code such that an initial request for a page component can be sent to the first collection server 4A and communication with the first collection server 4A facilitated. This code may comprise an "include" statement. The page 8 includes this code because it has been "client side tagged" in the way which is now conventionally used when monitoring the performance of websites. Whilst this client side tagging technique and the monitoring process itself are not described in detail in the current specification, it will be appreciated both that these techniques in themselves are conventional.

It is also important to note, however, that in the present embodiment the page 8 must be set up appropriately to generate messages, receive messages and process these accordingly. This means that the monitoring process used is self-contained in that the web pages to be monitored must be written to facilitate this monitoring. This means that if a user navigates to a page which is not appropriately set up, no monitoring will occur. This means that the current technique can be used in a way where there is no risk to the user that all of his or her activities will be monitored. This makes the current techniques more practical as they are acceptable.

In the present technique the collection server 4A, 4B, 4C to which a browser sends monitoring messages defaults to a collection server in the same domain as the page, but can be dynamically changed based on refer information included in the http messages as will be explained in more detail below. In the absence of a session context, each collection server 4A, 4B, 4C is arranged to recognise if an incoming request has a referrer which is within a list or "set" of sites/domains which are being monitored and as a result of this, redirect a request to a collection server 4A, 4B, 4C within the domain of the referrer. This can allow session continuity to be maintained as will be explained below. Session continuity can be utilised in many ways including session tracking, cross-domain log in, or cross-domain user rights and so on.

In this embodiment there are a set of sites or set of domains which are to be monitored by the system. This set includes the three web servers 1A, 1B, 1C and correspondingly the three domains A, B and C shown in FIG. 1. In practice of course, such a set of sites and domains to be monitored by a system of the present type could be much larger.

Returning now to the detail of the process, in step ST3, the page 8 sends an initial http request for a page component to the first collection server 4A. At this point there is no session context. In response to this request the first collection server 4A, in particular the first cookie control server 5A, sends in step ST4 script to the page 8 which includes an instruction to set a first party cookie within the browser 7. This script is then executed by the page 8. Because this processing occurs in the page, it occurs under the domain of the site being monitored and this allows the setting of a first party cookie in domain A. Once this first party cookie is in place, then as monitoring (or analytics) traffic is sent back to the first collection server 4A in step ST5 from the original page 8 or other pages 8 (in the same domain) which are appropriately set up, information contained in the first party cookie for domain A will be included in the messages to the first collection server 4A. In particular each such message may include a session ID to allow all of the monitored activities of the user in that browser session, whilst in the original domain, to be tied together.

At some point the user may leave the original domain and browse to other web sites such that a page 8 running within the browser 7 is from a different domain. In this example, we shall assume that the user activates a link in a page in domain A and hence navigates to a page 8 supplied by the second web server 1B and hence is now in domain B having just left domain A. The content is requested in step ST6 in FIG. 2 and returned in step ST7. Again assuming the page 8 loaded from the second web server 1B is appropriately set up and includes code that requests a page component from a collection server, then in step ST8 an initial http request will be sent from the page 8. In this case, in the present embodiment, because the requesting page 8 is in domain B the request will be directed at the second collection server 4B, which is in domain B. At this point there is no session context in domain B.

There is no session context in domain B because the cookie set in domain A during the previous steps is not visible to the browser 7 now that it is in domain B and nor is it visible to the second collection server 4B because this is also in domain B.

When the second collection server 4B receives the http request sent in step in ST8 and it determines that there is currently no session context, the second collection server 4B, in particular the second cookie control server 5B is arranged to check the http referrer information included in the request.

As is well known, under the http protocol, information concerning the identity of the object which caused the current page to be loaded into a browser can be included in http requests generated by that page. In concrete terms, as an example, this means that when a page is reached via a link from another page, the identity of that referring page can be seen by the browser and can be included in the http request. In the present technique, the current page's referrer is encoded, on the URL query string associated with the http request, by the browser. Thus, in the http request sent in step ST8 there is information included as part of the present technique which can be read by the second collection server 4B indicating that this page 8 which sent the request was reached via a link in a page in domain A.

As mentioned above the collection servers 4A, 4B, 4C collectively maintain a list of domains which are to be monitored as a set—in this case domains A, B and C.

Thus, at this stage, the second collection server 4B consults the list of domains which are to be treated as a set in the present implementation and determines that domain A is one such domain. As a result of this, in step ST9, the second collection server 4B sends an HTTP redirect message to the browser 7 indicating that the first collection server 4A should be used.

In response to this temporary redirect, the browser 7 is caused to resend, in step ST10, the request sent originally to the second collection server in step ST8. When this resent request is received by the first collection server 4A, it is able to read the first party cookie in domain A which was used during steps ST1 to ST5. Thus, the first collection server 4A is able to extract the session ID from that cookie. Moreover, it is able to determine that this request has been sent because the browser 7 has been instructed by a server (the second collection server 4B) in a different domain to resend the message. Moreover, it is able to determine that the browser 7 is currently operating in domain B. This means that the first collection server 4A is able to return code to the browser 7 in step ST11 which contains an instruction for the browser 7 to generate a first party cookie in domain B including the session ID retrieved from the domain A cookie.

After this code has been returned to the browser 7, it is executed which causes a first party cookie in domain B to be generated by the browser 7. Then when further interactions take place between the browser 7 and website in domain B, in step ST12, further monitoring messages will be sent to the second collection server 4B including the appropriate session number from the domain B cookie. Thus this activity can be tied up with that which took place in domain A since all these interactions will be associated with the same session ID.

If at some time in the future the user leaves domain B and browses a page from the third web server 1C having reached this from a link in a page in domain B, then the above process describes in relation to steps ST6 to ST12 can be repeated whilst there is transfer from domain B to domain C. That is to say, and referring again to FIG. 2, in step ST13 the user browses to domain C and in step ST14 receives the appropriate page in the browser 7. In step ST15 because the received page is in domain C it will contact the third collection server 4C in an attempt to establish session context. At this stage the third collection server 4C can see no session context. However, as explained above, in relation to steps ST8 and ST9, the third collection server 4C is able to see from the referrer information in the http request that the page currently being browsed was reached from a link in a page in domain B. Thus, the third collection server 4C sends, in step ST16, a redirect to the browser 7 indicating that the request should be resent to the second collection server 4B. In step ST17 this message is resent by the browser to the second collection server 4B and in step ST18 code is returned to the browser 7 including an instruction to set a cookie in domain C using the session number extracted from the cookie in domain B. After this, monitoring events in domain C may be sent by the browser, in the step ST19, along with the session number in the domain C cookie to the third collection server 4C. Again, as explained above these monitored activities may be tied together with those found in domains A and B.

It, of course, will be appreciated that if there were further websites in further domains which were also part of the "set" in the current implementation, it would also be possible for session context to be maintained as these websites in these other domains were browsed. Furthermore, of course it is possible for the user to return to domain A or B from domain C and for the context to be maintained. It should be noted that once a particular domain has been visited during a particular browser session, then an appropriate cookie giving a session ID for that session will exist. Thus, if that domain is revisited during the same browser session, it will not be necessary to go through the whole procedure outlined above. That is to say when the step is taken (in for example, step ST3, ST8 or ST15) to seek allocation of a session number, if the domain has already been visited then that initial request will include a cookie in that domain and thus the collection server concerned 4A, 4B and 4C may simply set the session ID equal to that found in the cookie. There would then be no need for any redirection process and monitoring activity could commence straightaway.

Figure 3:
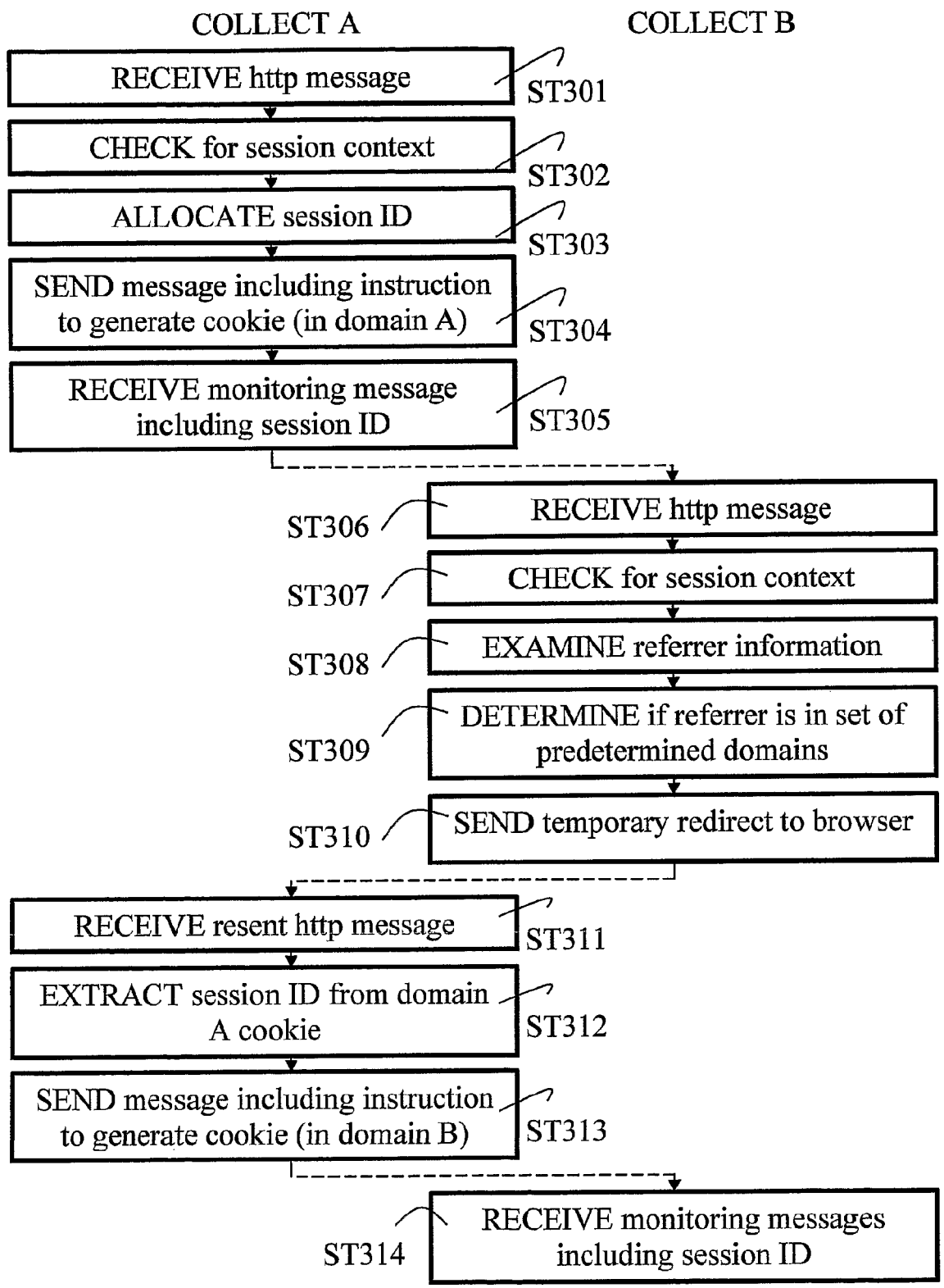
FIG. 3 is a flow chart showing the process carried out at a pair of cookie control servers of the website monitoring system.

FIG. 3 shows a flow chart showing the processes carried out at the first and second collection servers 4A and 4B in steps ST1 to ST12 of the overall process indicated in FIG. 2. As will be appreciated, a similar series of steps take place during the steps ST13 to ST19 in FIG. 2.

In a first step ST301 an http message is received at the first collection server 4A from a page 8 in the browser 7. In a second step ST302 the first collection server 4A checks for session context. In a third step ST303 in the absence of a session context at this stage, a session ID is allocated to the session. In step ST304 the first collection server 4A sends a message including an instruction to generate a cookie in domain A to the browser 7. Following this, the first collection server 4A is able to receive monitoring messages, in step ST305, from the browser 7 including the session ID. This of course means that those pieces of monitoring information may be tied together.

Later when the browser 7 moves from domain A to domain B by virtue of the user activating a link in a page in domain A to a page in domain B, the second collection server 4B receives an http message in step ST306. Again, there is a check made for session context, this time by the second collection server 4B in step ST307. Here again, no session context is found as the cookie in domain A cannot be seen by the second collection server 4B. Next, in step ST308, the referrer information included in the incoming URL associated with the http message is examined. In step ST309 it is determined whether the referrer referred to in this referrer information is in the predetermined set of domains/sites which are to be monitored by this particular implementation. Here, of course, it is in this case.

In step ST310 a redirect is sent by the second collection server 4B to the browser 7 instructing that the message must be resent to the collection server 4A in the domain of the referrer. This causes the http message to be resent and this is received by the first collection server 4A in step ST311. In this instance the message will have, in its header, the domain A cookie generated as a result of the sending of the message in step ST304 and thus the session ID can be extracted from this domain A cookie in step ST312. As a result of this the first collection server 4A is able to send, in step ST313, a message to the browser 7 including an instruction to generate a cookie including the same session ID. Of course this cookie generated will be in domain B as the currently active page 8 in the browser is in domain B.

Thus, when further activity is undertaken in the browser in domain B, monitoring messages including the session ID may be received by the second collection server 4B in step ST314.

Figure 4:
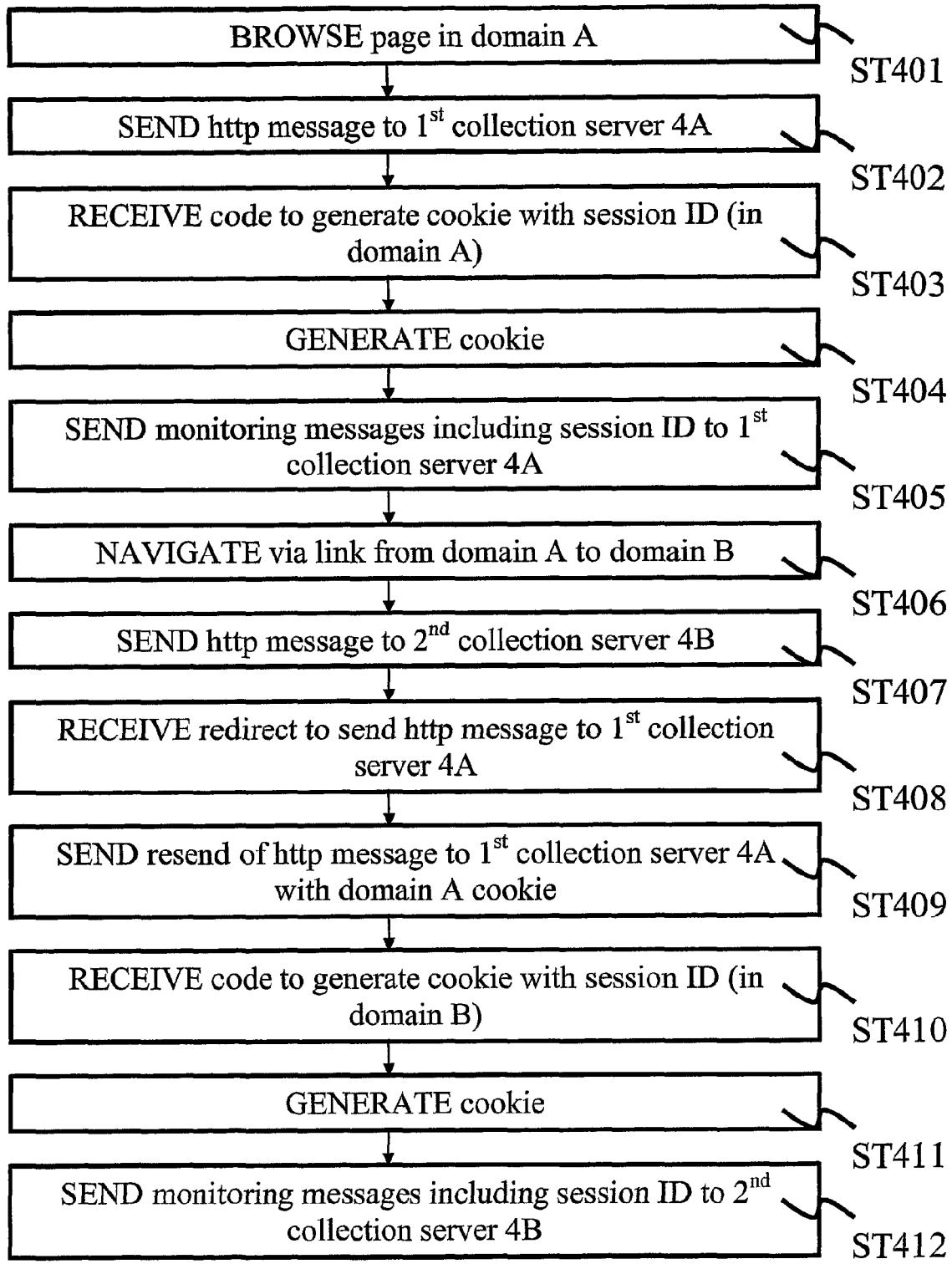
FIG. 4 shows a flow chart showing the process carried out at a client device when interacting with the cookie control servers.

FIG. 4 shows a flow chart showing the process carried out at the client device during the overall process shown in FIG. 2, in particular those parts between steps ST1 and ST12. Again a similar process will take place as part of steps ST13 to ST19 in FIG. 2.

In a first step ST401 the browser 7 in the client device 6 browses a page in domain A. In response to the contents of that page 8 the browser 7 is caused, in step ST402, to send an http message to the first collection server 4A which is in domain A. As a result of sending this message the browser 7 receives, in step ST403, code from the first collection server 4A to generate a cookie with a session ID. This cookie is generated in domain A in step ST404. In step ST405 monitoring messages including the session ID are sent to the first collection server 4A.

At some later time, in step ST406, the user navigates away from domain A via a link in a domain A page to a page in domain B. As a result of the content of that page in domain B, in step ST407, the browser 7 is caused to send an http message to the second collection server 4B having encoded the referrer information of the page in domain B (which identifies the page in domain A as the referrer) on the URL query string associated with that http message. The browser then receives a temporary redirect to resend the http message to the first collection server 4A in step ST408.

This message is resent to the first collection server 4A in step ST409. Because the first collection server 4A is in domain A, this resend of the message is accompanied by the domain A cookie. In step ST410 the browser 7 receives code from the first collection server 4A to generate a cookie including the session ID. At this stage, because the browser 7 is browsing a page in domain B, the cookie will be generated in domain B. This domain B cookie is generated in step ST411. In step ST412 the browser 7 sends monitoring messages including the session ID to the second collection server 4B.

It will be appreciated that these types of steps can be continued by the browser 7 in the client device 6 as and when the user browses to other sites, for example, those in domain C.

It will be seen that session continuity is maintained as a user/browser moves from one domain in the predetermined set of domains (which might be termed a "portal set") to another. Moreover, this session continuity will be maintained if the user leaves the set of domains/sites and subsequently returns to a site which they have previously visited in the session. This occurs because when returning to a site or domain which they have previously visited, there will be the pre-existing cookie in that domain which can be used to recover the session ID and tie together these session events with those generated earlier.

However, if during a session, the user browses away from the monitored set of sites, their activity whilst away from the set of sites will not be monitored as part of the presently described set of monitoring. Those activities may of course be monitored separately if those other sites are appropriately set up. As an example, the user might browse to a site which is in another set of sites/set of domains which is monitored by another instance of the present type of monitoring system.

Further, if permanent cookies are used in an alternative there can be linking of monitored activity across separate browser sessions.

It will be appreciated that the processes described above may be used in different ways. Whilst at the most basic level, as described above, a session ID may be extracted and reassigned for generation in a first party cookie of the correct domain, other uses can be envisaged. For example, the collection server/cookie control server may determine that a modified session ID should be included in the cookie to be generated. Of course, this could be done in a way such that the session IDs can still be tied together with one another, but modification of the session ID may allow the encoding of further information.

A broader range of alternatives also exists. Any data which is present in the first party cookie may be extracted and almost anything may be done with it. Similarly the message sent back to the page may include instruction to do almost anything. Thus, for example, if the first party cookie includes a customer ID, log in state or so on, then this could, at least in some circumstances, be extracted and processed and fed back to page sending the http message.

This means for example, that if a user is navigating though pages in one domain having had to log on to the appropriate website, and then moves across to another domain, a secure user session may be seamlessly created for that user in the website on the new domain by virtue of the log in state being extracted from the initial first party cookie in the first domain and used to generate a message to cause an appropriate first party cookie in the new domain to be generated within the browser.

In a practical set up, an enterprise having websites in a number of domains would have a corresponding collection server 4A, 4B, 4C and cookie control server 5A, 5B, 5C set up in each domain. In some instances, it may be necessary for the websites to be monitored to implement a security policy such as P3P to give successful operation.

Whilst the above description has been written in terms of a conventional PC running a conventional browser it will be appreciated that in alternatives the client device 6 may be differently constituted. In particular the client device might comprise a mobile telephone or other such device and might comprise an embedded browser.

The present invention may be embodied in one or more computer programs carried by machine readable media, for example, a signal, a CD-Rom, a flash memory device, a hard disk or so on, such programs being arranged to cause a server, client device or other computer (in the broadest sense) to operate as described above. Similarly the invention may be embodied in apparatus comprising a computer (in the broadest sense) set-up under the control of such programs to operate as described above.

What is claimed is
1. A method for setting a first domain first party cookie in a first domain on a client device comprising:
receiving at a first server, an http message from an active page within a browser running on the client device, the http message including referrer information indicating a referrer in a second domain and the page being in the first domain;

checking the referrer information in the http message to determine (a) if the referrer is within a domain among a predetermined set of domains, and if the referrer is within a domain within the predetermined set of domains, then sending a redirect message in accordance with the referrer information to the browser instructing the browser to resend the http message to a second server, the second server being in the second domain, or (b) if such is not the case, then sending a response without sending a redirect message;

receiving at the second server, the http message from the browser and extracting data from a second domain first party cookie in the second domain present in the header of the http message;

determining data which is to be included in the first domain first party cookie resident on the client device in dependence on the data extracted from the second domain first party cookie present in the header of the resent http message; and sending a message to the active page in the first domain including an instruction comprising added computer instruction code executable by the browser which, when executed, generates the first domain first party cookie within the browser, including the data determined in the determining step.

2. A method according to claim 1 which comprises the further step, before the checking referrer information step, of checking for an absence of session context between the browser and the first server.

3. A method according to claim 1 in which the step of extracting data from the second domain first party cookie present in the header of the http message comprises the step of extracting a session ID from the second domain first party cookie.

4. A method according to claim 3 in which the message sent to the active page includes an instruction to generate the first domain first party cookie including a session ID determined in dependence on the extracted session ID.

5. A method according to claim 1 in which the method comprises the further step of receiving further messages, at the first server, from at least one of the same page and another page, within the browser that include data derived from the first domain first party cookie.

6. A method according to claim 1 in which the method comprises the further step of the first server receiving a plurality of http messages and determining whether the http messages are from the same browser session in dependence on the data, derived from the first domain first party cookie, present in each http message.

7. A method according to claim 1 comprising, after the steps defined in claim 1, the further steps of:
receiving at a third server, an http message from an active page within a browser running on the client device, the page being in a third domain;
checking the referrer information in the http message and on determining that the referrer is in the first domain, sending a redirect message to the browser instructing the browser to resend the http message to the first server;
receiving at the first server, the http message from the browser and extracting data from the first domain first party cookie, present in the header of the http message;
determining data which is to be included in a third domain first party cookie, within the third domain, resident on the client device in dependence on the data extracted from the first domain first party cookie, present in the header of the resent http message; and
sending a message to the active page including an instruction to generate the third domain first party cookie within the browser, including the data determined in the determining step.

8. A method according to claim 1 in which there is provided a set of servers comprising at least the first server and the second server with each server in the set being in a different domain within the predetermined set of domains and being arranged to selectively carry out steps corresponding to each of the steps defined in claim 1.

9. A method according to claim 8 in which the method comprises the step of each server in the set of servers, receiving an http message from a respective active page within a browser running on the client device, each respective page being in the same domain as the respective server.

10. A website monitoring method comprising a method according to claim 1 and the further step of receiving, from the browser running on the client device, monitoring information concerning at least one of webpage interactions and performance.

11. A method according to claim 10 comprising the step of providing at least one collection server for collecting the monitoring information.

12. A computer program product comprising a non-transitory machine-readable data medium carrying a program comprising code portions which, when loaded and run on at least one computer, cause the at least one computer to carry out the method claimed in claim 1.

13. Apparatus for causing setting of a first domain first party cookie in a first domain on a client device, the apparatus comprising a first server and a second server, the first server comprising at least one computer and being arranged under the control of software to:
receive an http message from an active page within a browser running on the client device, the http message including referrer information indicating a referrer in a second domain and the page being in the first domain;
check the referrer information in the http message to determine (a) if the referrer is within a domain among a predetermined set of domains, and if the referrer is within a domain within the predetermined set of domains, then send a redirect message in accordance with the referrer information to the browser instructing the browser to resend the http message to a second server, the second server being in the second domain, or (b) if such is not the case, then sending a response without sending a redirect message;
the second server comprising at least one computer and being arranged under the control of software to:
receive the http message from the browser and extract data from a second domain first party cookie in the second domain present in the header of the http message;
determine data which is to be included in the first domain first party cookie resident on the client device in dependence on the data extracted from the second domain first party cookie present in the header of the resent http message; and
send a message to the active page in the first domain including an instruction comprising added computer instruction code executable by the browser which, when executed, generates the first domain first party cookie within the browser, including the data determined in the determining step.

14. Apparatus according to claim 13 comprising a set of servers comprising at least the first server and the second server, with each server in the set being in a different domain within the predetermined set of domains and each being arranged under the control of software to selectively carry out the operations defined in claim 13.

15. A computer program product comprising a non-transitory machine-readable data medium carrying a program comprising code portions which, when loaded and run on a computer, cause the computer to comprise the apparatus claimed in claim 13.

16. Apparatus for causing setting of a first domain first party cookie in a first domain on a client device, the apparatus comprising a first server and a second server, the first server comprising at least one computer and having:
    a receive module configured to receive an http message from an active page within a browser running on the client device, the http message including referrer information indicating a referrer in a second domain and the page being in the first domain;
    a check module configured to check the referrer information in the http message to determine (a) if the referrer is within a domain among a predetermined set of domains, and if the referrer is within a domain within the predetermined set of domains then causing sending of a redirect message, by a send module, to the browser instructing the browser to resend the http message to a second server, the second server being in the second domain, or (b) if such is not the case, then sending a response without sending a redirect message;
    the second server comprising at least one computer and having:
    a receive module configured to receive the http message from the browser;
    an extract module configured to extract data from a second domain first party cookie in the second domain present in the header of the http message;
    a determination module configured to determine data which is to be included in the first domain first party cookie resident on the client device in dependence on the data extracted from the second domain first party cookie present in the header of the resent http message; and
    a send module configured to send a message to the active page in the first domain including an instruction comprising added computer instruction code executable by the browser which, when executed, generates the first domain first party cookie within the browser, including the data determined by the determination module.

17. A website monitoring method comprising the steps of:
    receiving at a first server, an http message from an active page within a browser running on a client device, the page being in a first domain and the http message including referrer information indicating a referrer in a second domain;
    checking the referrer information in the http message to determine (a) if the referrer is within a domain among a predetermined set of domains, and if the referrer is within a domain within the predetermined set of domains, then sending a redirect message to the browser instructing the browser to resend the http message to a second server, the second server being in the second domain, or (b) if such is not the case, then sending a response without sending a redirect message;
    receiving at the second server, the http message from the browser and extracting data from a second domain first party cookie in the second domain present in the header of the http message;
    determining data which is to be included in a first domain first party cookie in the first domain, resident on the client device in dependence on the data extracted from the second domain first party cookie present in the header of the resent http message;
    sending a message to the active page in the first domain including an instruction comprising added computer instruction code executable by the browser which, when executed, generates the first domain first party cookie within the browser, including the data determined in the determining step; and
    receiving at one of the first server and a separate collection server, from the browser running on the client device, messages including data derived from the first domain first party cookie and information concerning at least one of: interactions with and performance of at least one page browsed within the browser running on the client device.

18. A website monitoring apparatus, the apparatus comprising:
    a first server, a second server, and a collection server, the first server including at least one computer and being arranged under the control of software to:
    receive an http message from an active page within a browser running on a client device, the page being in a first domain and the http message including referrer information indicating a referrer in a second domain;
    check the referrer information in the http message to determine (a) if the referrer is within a domain among a predetermined set of domains, and if the referrer is within a domain within the predetermined set of domains, then send a redirect message to the browser instructing the browser to resend the http message to a second server, the second server being in the second domain, or (b) if such is not the case, then sending a response without sending a redirect message;
    the second server including at least one computer and being arranged under the control of software to:
    receive the http message from the browser and extract data from a second domain first party cookie in the second domain present in the header of the http message;
    determine data which is to be included in a first domain first party cookie in the first domain, resident on the client device in dependence on the data extracted from the second domain first party cookie present in the header of the resent http message; and
    send a message to the active page in the first domain including an instruction comprising added computer instruction code executable by the browser which, when executed, generates the first domain first party cookie within the browser, including the data determined in the determining step; and
    the collection server including at least one computer and being in the first domain and arranged under the control of software to:
    receive, from the browser running on the client device, messages including data derived from the first domain first party cookie, and information concerning at least one of: interactions with and performance of at least one page browsed within the browser running on the client device; and
    determine whether received messages are from the same browser session in dependence on the data derived from the first domain first party cookie present in each message.

19. A website monitoring apparatus, the apparatus comprising:
    a first server, a second server, and a collection server, the first server including at least one computer and having:

a receive module for receiving an http message from an active page within a browser running on a client device, the page being in a first domain and the http message including referrer information indicating a referrer in a second domain;

a check module for checking the referrer information in the http message to determine (a) if the referrer is within a domain among a predetermined set of domains, and if the referrer is within a domain within the predetermined set of domains then causing sending of a redirect message, by a send module, to the browser instructing the browser to resend the http message to the second server, the second server being in the second domain, or (b) if such is not the case, then sending a response without sending a redirect message;

the second server including at least one computer and having:

a receive module for receiving the http message from the browser;

an extract module for extracting data from a second domain first party cookie in the second domain present in the header of the http message;

a determination module for determining data which is to be included in a first domain first party cookie in the first domain, resident on the client device in dependence on the data extracted from the second domain first party cookie present in the header of the resent http message; and a send module for sending a message to the active page in the first domain including an instruction comprising added computer instruction code executable by the browser which, when executed, generates the first domain first party cookie within the browser, including the data determined by the determination module; and the collection server comprising:

a receive module for receiving, from the browser running on the client device, messages including data derived from the first domain first party cookie and information concerning at least one of: interactions with and performance of at least one page browsed within the browser running on the client device; and a determination module for determining whether received messages are from the same browser session in dependence on the data derived from the first domain first party cookie present in each message.

20. A website monitoring apparatus according to claim 19 in which the first server comprises the collection server.

21. A method for setting a first domain first party cookie in a first domain on a client device comprising:

sending from an active page, in the first domain, within a browser running on the client device, to a first server, an http message including referrer information indicating a referrer in a second domain;

receiving a redirect message in the browser, from the first server, instructing the browser to resend the http message to a second server, the second server being in the second domain;

resending from the browser, the http message to the second server including a second domain first party cookie in the second domain in the header of the http message;

receiving a message, from the second server, in the active page in the first domain including an instruction comprising added computer instruction code executable by the browser which, when executed, generates the first domain first party cookie within the browser, including the data determined in dependence on the content of the second domain first party cookie as received by the second server; and generating within the browser running on the client device, the first domain first party cookie in response to the received instruction.

22. A client device including at least one computer and arranged under the control of software to:

send from an active page, in a first domain, within a browser running on the client device, to a first server, an http message including referrer information indicating a referrer in a second domain;

receive a redirect message in the browser, from the first server, instructing the browser to resend the http message to a second server, the second server being in the second domain;

resend from the browser, the http message to the second server including a second domain first party cookie in the second domain in the header of the http message;

receive a message, from the second server, in the active page in the first domain including an instruction comprising added computer instruction code executable by the browser which, when executed, generates a first domain first party cookie in the first domain within the browser, including the data determined in dependence on the content of the second domain first party cookie as received by the second server; and generate within the browser running on the client device, the first domain first party cookie in response to the received instruction.

* * * * *